US011183185B2

(12) United States Patent
Cartwright et al.

(10) Patent No.: US 11,183,185 B2
(45) Date of Patent: Nov. 23, 2021

(54) TIME-BASED VISUAL TARGETING FOR VOICE COMMANDS

(71) Applicant: Microsoft Technology Licensing, LLC, Redmond, WA (US)

(72) Inventors: Luke Cartwright, Seattle, WA (US); Alexander James Thaman, Woodinville, WA (US); Alton Hau Kwong Kwok, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 16/243,967

(22) Filed: Jan. 9, 2019

(65) Prior Publication Data
US 2020/0219501 A1    Jul. 9, 2020

(51) Int. Cl.
*G10L 15/22* (2006.01)
*G06F 3/01* (2006.01)
(Continued)

(52) U.S. Cl.
CPC ............. *G10L 15/22* (2013.01); *G06F 3/013* (2013.01); *G10L 15/24* (2013.01); *G10L 15/30* (2013.01); *G10L 2015/223* (2013.01)

(58) Field of Classification Search
CPC .......... G06F 3/013; G06F 3/017; G06F 3/167; G06F 3/012; G06F 2203/0381; G06F 3/038; G06F 3/04815; G06F 16/3344; G06F 16/355; G06F 16/41; G06F 16/44; G06F 16/71; G06F 3/011; G06F 3/0346;
(Continued)

(56) References Cited

U.S. PATENT DOCUMENTS 6,731,307 B1 * 5/2004 Strubbe ................... G10L 17/26
715/727
8,024,195 B2    9/2011 Mozer et al.
(Continued)

FOREIGN PATENT DOCUMENTS

| WO | 2013110190 A1 | 8/2013 |
| WO | 2015125375 A1 | 8/2015 |
| WO | 2016049439 A1 | 3/2016 |

OTHER PUBLICATIONS

"International Search Report and Written Opinion Issued in PCT Application No. PCT/US19/068458", dated Mar. 12, 2020, 10 Pages.

*Primary Examiner* — Abdelali Serrou
(74) *Attorney, Agent, or Firm* — Alleman Hall Creasman & Tuttle LLP

(57) ABSTRACT

A method performed by a computing system for directing a voice command to a function associated with a visual target includes receiving a set of time-variable sensor-based data streams, including an audio data stream and a targeting data stream. The targeting data stream is stored in a buffer as buffered targeting data. Presence of a spoken utterance is identified within the audio data stream and is associated with a temporal identifier corresponding in time to the set of sensor-based data streams. A voice command corresponding to the spoken utterance is identified. A visual targeting vector within the buffered targeting data and a visual target of that visual targeting vector is identified at a time corresponding to the temporal identifier. The voice command is directed to a function associated with the visual target to generate an output.

17 Claims, 5 Drawing Sheets

(51) Int. Cl.
*G10L 15/24* (2013.01)
*G10L 15/30* (2013.01)

(58) Field of Classification Search
CPC ............... G06F 3/03547; G06F 3/0484; G06F 3/04842; G06F 3/0488; G10L 2015/227; G10L 15/22; G10L 2015/223; G10L 21/06; G10L 15/1822; G10L 15/24; G10L 2015/088; G10L 2015/226; G10L 15/30
See application file for complete search history.

(56) References Cited

U.S. PATENT DOCUMENTS

| | | | |
|---|---|---|---|
| 8,482,859 B2 | 7/2013 | Border et al. | |
| 9,141,193 B2* | 9/2015 | Perez | G06F 3/16 |
| 9,190,058 B2* | 11/2015 | Klein | G10L 15/22 |
| 9,250,703 B2 | 2/2016 | Hernandez-Abrego et al. | |
| 9,268,404 B2* | 2/2016 | Clavin | G06F 3/017 |
| 9,530,410 B1* | 12/2016 | LeBeau | G10L 15/22 |
| 9,544,491 B2 | 1/2017 | Pryszo et al. | |
| 9,666,187 B1 | 5/2017 | Pinsky et al. | |
| 9,911,418 B2 | 3/2018 | Chi | |
| 9,990,921 B2 | 6/2018 | VanBlon et al. | |
| 10,058,997 B1* | 8/2018 | Chao | B25J 9/163 |
| 10,282,057 B1* | 5/2019 | Binder | G06F 3/012 |
| 10,289,205 B1* | 5/2019 | Sumter | G06F 3/017 |
| 10,438,589 B2* | 10/2019 | Jung | G10L 15/22 |
| 10,534,438 B2* | 1/2020 | Klein | G06F 3/038 |
| 2006/0136221 A1* | 6/2006 | James | G10L 15/26 704/275 |
| 2012/0051588 A1* | 3/2012 | McEldowney | G03B 21/14 382/103 |
| 2012/0110456 A1* | 5/2012 | Larco | G06F 3/167 715/728 |
| 2012/0257035 A1* | 10/2012 | Larsen | G06F 3/017 348/78 |
| 2013/0030811 A1* | 1/2013 | Olleon | G06F 3/013 704/267 |
| 2013/0044128 A1* | 2/2013 | Liu | G06T 19/006 345/633 |
| 2013/0086105 A1* | 4/2013 | Hammontree | G06F 16/248 707/769 |
| 2013/0304479 A1* | 11/2013 | Teller | G06F 3/0481 704/275 |
| 2015/0039319 A1* | 2/2015 | Mei | G10L 15/1822 704/275 |
| 2015/0210292 A1* | 7/2015 | George-Svahn | B60K 28/02 701/45 |
| 2015/0254053 A1* | 9/2015 | Gardner | H03G 3/04 700/83 |
| 2016/0091967 A1* | 3/2016 | Prokofieva | G10L 17/22 345/156 |
| 2017/0010662 A1 | 1/2017 | Nishizawa et al. | |
| 2017/0061694 A1 | 3/2017 | Giraldi et al. | |
| 2017/0061702 A1* | 3/2017 | Christen | G02B 27/017 |
| 2017/0092007 A1* | 3/2017 | Goldberg | G06K 9/00597 |
| 2017/0339340 A1* | 11/2017 | Bayser | H04N 5/23216 |
| 2018/0151178 A1* | 5/2018 | Wang | G06Q 30/0201 |
| 2018/0321826 A1* | 11/2018 | Bereza | G06F 3/04883 |
| 2018/0357040 A1* | 12/2018 | Spiewla | G06F 3/017 |
| 2018/0365897 A1 | 12/2018 | Pahud et al. | |
| 2019/0005123 A1* | 1/2019 | Byron | G06F 16/355 |
| 2019/0254753 A1* | 8/2019 | Johnson | A61B 34/20 |
| 2020/0218488 A1* | 7/2020 | Nguyen | G06K 9/00832 |

* cited by examiner

TIME-BASED VISUAL TARGETING FOR VOICE COMMANDS

BACKGROUND

Computers supporting natural user input (NUI) may enable the use of voice commands to control computer functionality. Audio data captured by a microphone may be analyzed using speech recognition to identify a voice command, which may be used as input to a computer function. Support for voice commands expands user input modalities beyond manipulation of physical devices, such as a computer mouse, touch screen, keyboard, or controller.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to associating voice commands and visual targeting data for computing device input. One example provides a method performed by a computing system. The method comprises receiving a set of time-variable sensor-based data streams captured by a set of sensors, wherein the set of data streams includes an audio data stream and a targeting data stream. The targeting data stream is stored in a buffer as buffered targeting data. The method further comprises identifying a presence of a spoken utterance within the audio data stream and associating the spoken utterance with a temporal identifier corresponding in time to the set of sensor-based data streams. The method further comprises identifying a voice command corresponding to the spoken utterance, and identifying a visual targeting vector within the buffered targeting data and a visual target of that visual targeting vector at a time corresponding to the temporal identifier. The voice command is directed to a function associated with the visual target to generate an output.

DETAILED DESCRIPTION

Figure 1:
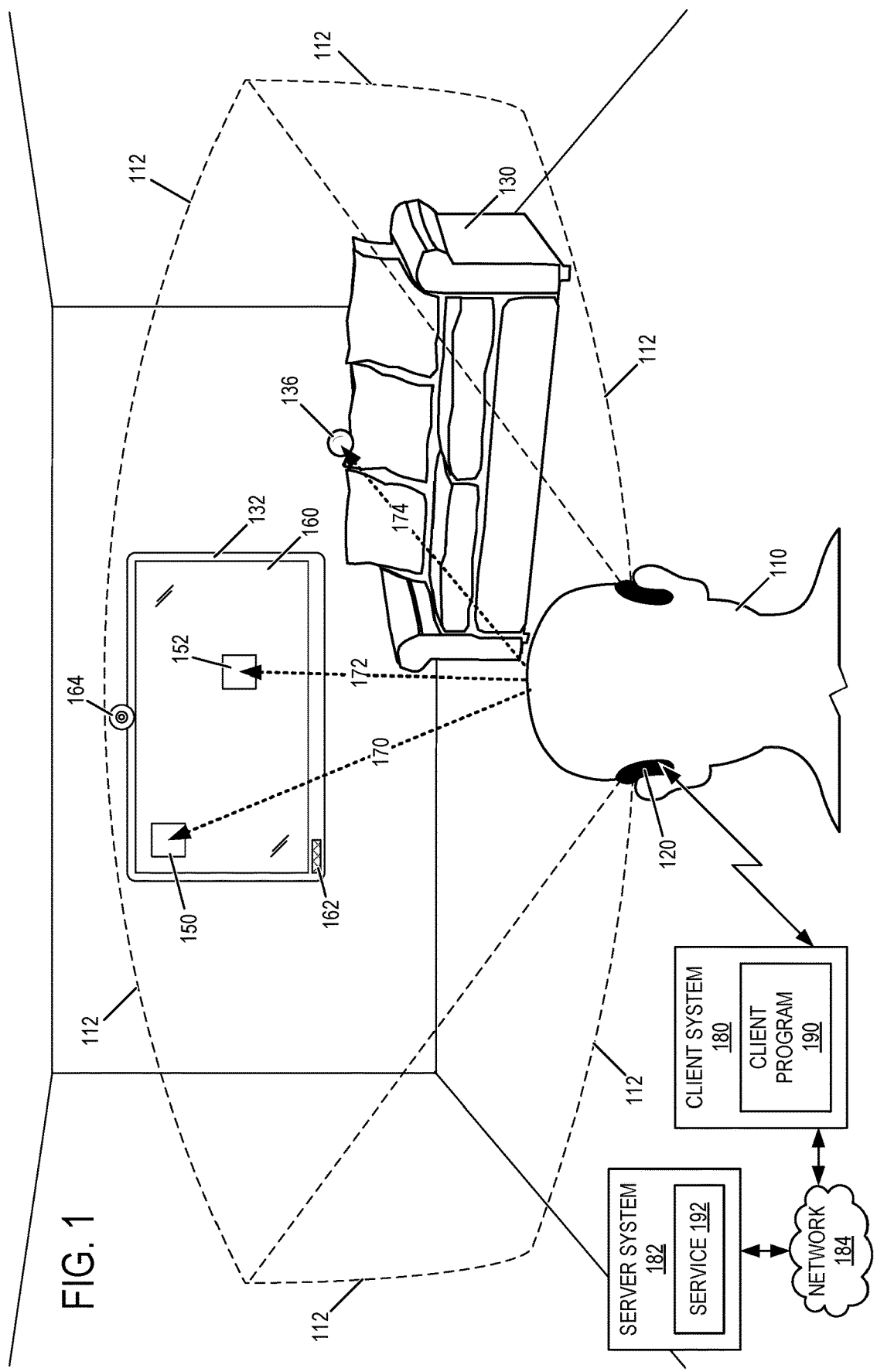
FIG. 1 depicts an example environment in which visual targeting is used in combination with voice commands.

Visual targeting of physical and virtual objects may be used in combination with natural language speech to enable a user to direct a voice command to a function associated with the visually targeted object. However, processing of audio data to identify voice commands may introduce delay due to various factors, including compute time for analysis of the audio data, network latency in the case offboarding of analysis to remote computing devices, and the time-based nature of human speech in which a spoken utterance occupies a finite duration of time. Furthermore, users may rapidly and frequently change their visual targeting between or among objects within an environment. By the time speech recognition has identified a voice command, it may be too late to determine what the user was visually targeting at a time of the user's speech, or speech commands may be misapplied to unintended objects.

To address this issue of delay associated with identification of voice commands, in the disclosed examples, objects visually targeted by a user may be identified through the use of one or more targeting analysis techniques, including (1) proactive targeting analysis in which candidate visual targets are identified and buffered prior to detecting a spoken utterance within an audio data stream, (2) reactive targeting analysis of a buffered targeting data stream upon or following identification of the voice command, and (3) real-time targeting analysis of the targeting data stream upon identifying presence of a spoken utterance within the audio data stream, which may precede identification of a corresponding voice command.

Each of the above targeting analysis techniques may have respective technical characteristics in terms of (1) the use of computational resources, (2) the use of data storage resources, and (3) the accuracy of the estimate of the visual target by the analysis. Selection of an appropriate targeting analysis technique may depend on features of a computing system that implements the targeting analysis pipeline (e.g., processing and/or storage capability), operating conditions associated with the use-environment, and/or desired performance requirements.

For example, real-time targeting analysis performed at a time when a user is speaking may be less computationally costly and may be performed more quickly than reactive targeting analysis that awaits identification of a voice command. However, real-time targeting analysis may be less accurate than reactive or proactive targeting analyses in which additional context may be considered through buffering of historic targeting data. In contrast, reactive targeting analysis may be computationally efficient, but utilize greater data storage resources for the buffering of targeting data, or may discard contextual information from the buffered targeting data due to storage constraints or from the analysis due to processing time constraints. In further contrast, proactive targeting analysis, in which targeting may be constantly performed even in the absence of spoken utterances or commands, utilizes computational resources to perform throwaway targeting results, but may provide for increased accuracy in relation to other targeting analysis techniques, and enables targeting to be performed as in instances where a voice command is detected with very low latency. Furthermore, proactive targeting analysis may utilize fewer data storage resources for buffering of candidate visual targets as compared to reactive targeting analysis that buffers the targeting data stream. Accordingly, selection of an appropriate targeting analysis technique may depend on the computational expense of the targeting analysis technique, an amount of targeting data that is available, resource (e.g. storage) constraints of the computing system, and performance requirements.

FIG. 1 depicts an example environment in which visual targeting is used in combination with voice commands. In this example, a user 110 has a field of view (FOV) 112 within the environment, which may correspond to a physical environment, a virtual environment (i.e., virtual reality), or a combination of physical and virtual environments into a mixed environment (i.e., mixed reality). Objects within FOV 112 may be physical objects, such as a couch 130 or a display device 132. Alternatively or additionally, objects within FOV 112 may be virtual objects, such as a virtual ball 136. Virtual objects may be presented to user 110 via an HIVID device 120, as an example. See-through HIVID devices may enable both physical and virtual objects to be viewed within the same FOV to provide a mixed reality experience. For example, virtual ball 136 may be graphically displayed to user 110 via HIVID device 120 in a manner that provides the appearance of the ball being present within the physical environment. Graphical displays having a forward-facing camera capturing a camera view of the physical environment may also provide a mixed reality experience by displaying virtual objects in combination with the camera view.

Within FOV 112, user 110 may focus on a point in the environment. For example, user 110 may initially focus on a graphical object 150 presented via a graphical display 160 of display device 132 as indicated by a visual targeting vector 170. The user's focus may transition to another graphical object 152 presented via graphical display 160 as indicated by visual targeting vector 172. The user's focus may further transition to yet another object, such as ball 136 as indicated by visual targeting vector 174. It will be understood that the visual targeting vectors depicted in these examples may represent a gaze axis defined in relation to a head of the user or an optical axis of an individual eye of the user in which each eye may have its own vector that converges on a point of focus.

A point of focus or intersection of a visual targeting vector with an object at a particular time may be referred to as a visual target. Gaze tracking and/or eye tracking may be used to identify a visual targeting vector and hence a visual target of a user. Within the context of a wearable device or handheld device, a rearward-facing camera may image an eye of the user to identify the visual targeting vector based on eye tracking. Gaze tracking sensors, including inertial sensors, optical sensors, or other suitable sensors located on-board a wearable device may be used identify the visual targeting vector based on gaze tracking. Eye tracking and/or gaze tracking may be performed by sensors of peripheral devices, such as a camera 164 associated with a computer, television, or Internet of Things (IoT) device that observes user 110 from a remote location.

In at least some examples, a visual targeting vector determined based on eye tracking and/or gaze tracking may be further refined by input received from other sources, such as sensors that observe body gestures of a user from which a pointing direction or other body gesture of user 110 may be determined. For example, inertial sensors and/or optical sensors of wearable devices or optical sensors observing user 110 from a remote location may be used to determine a pointing vector representing a pointing direction of the user. The pointing vector may be combined with an eye tracking vector and/or gaze tracking vector to determine a visual targeting vector. This approach recognizes that some people may visually target in regions with their eyes, but may refine or reinforce targeting with pointing or other body gestures.

User 110 may provide a spoken utterance containing one or more voice commands that are captured as audio data via an audio sensor, such as a microphone. The microphone may be integrated with a wearable device (e.g., 120) or handheld device, or may be a peripheral device, such as microphone 162. A voice command within a spoken utterance may take the form of a keyword or key-phrase that is predefined within a library of supported voice commands that are recognizable by the computing system. At least some voice commands may be directed to a function associated with a visual object to generate an output or result. As an example, a voice command by user 110 may be directed to a first function associated with graphical object 150. User 110 may, for example, visually target graphical object 150, which may correspond to a volume up selector, and speak the command "select" to direct the voice command to a volume up function associated with the graphical object to thereby increase volume of an audio/visual player application. In at least some examples, a user may enact more complex functions by combining or linking two or more voice commands within a spoken utterance. For example, a user may speak the phrase "put this over there" in which the terms "put", "this", and "there" correspond to respective voice commands.

Wearable device 120 and/or peripheral devices (e.g., 160, 162, 164, etc.) may communicate with a local client system 180 and/or a remote server system 182 via a communications network 184. Communication network 184 may include wired and/or wireless local and/or wide area network components. Client system 180 may include one or more computing devices that execute a client program 190, such as an operating system or application. Server system 182 may include one or more server computing devices that execute a service 192 that is accessible to clients over communication network 184. An example computing system is described in further detail with reference to FIG. 5.

Figure 2:
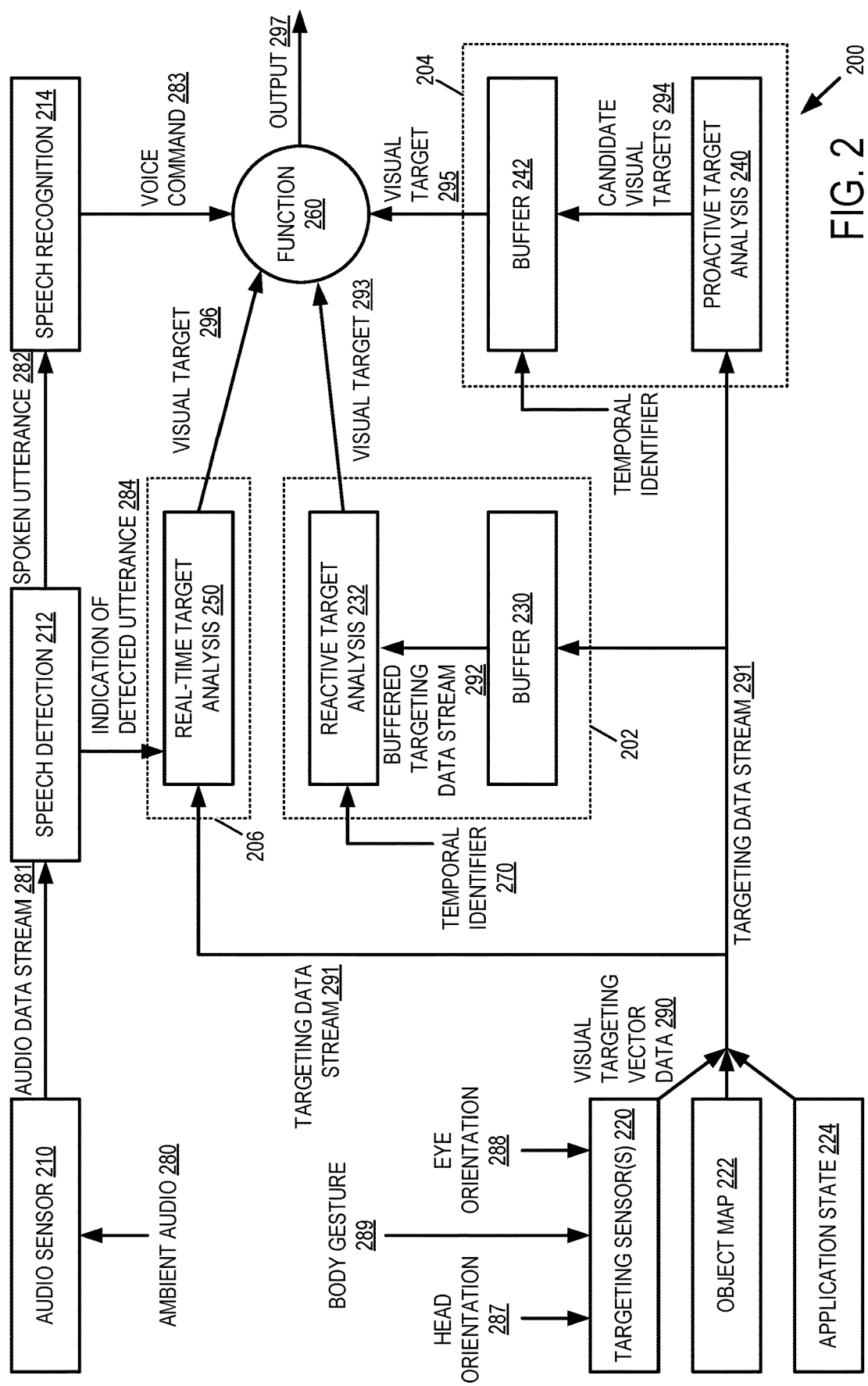
FIG. 2 is a schematic diagram depicting an example processing pipeline for visual targeting in combination with voice commands.

FIG. 2 is a schematic diagram depicting an example processing pipeline 200 for visual targeting in combination with voice commands. Within processing pipeline 200, ambient audio 280 is captured by an audio sensor 210, which generates a resulting audio data stream 281. Speech detection 212 may be applied to audio data stream 281 to identify presence of one or more spoken utterances (e.g., spoken utterance 282) within the audio data stream. Speech detection 212 may be implemented by a speech detection module of a computer executed program, as an example. A speech detection module may reside locally at a user device or may be remotely located from the user at a server system.

Speech recognition 214 may be applied to audio data stream 281 or a processed form thereof (e.g., an audio segment containing spoken utterance 282) to identify one or more voice commands (e.g., voice command 283) corresponding to the spoken utterance. Speech recognition 214 may be implemented by a speech recognition module of a computer executed program, which may be local or remote. Each voice command within spoken utterance 282 may take the form of a predefined keyword, key-phrase that is recognizable by the speech recognition module that performs speech recognition 214. In at least some examples, a library of pre-defined keywords or key-phrases may be supported by one or more computer programs enacting processing pipeline 200. This library may take the form of a database in which keywords or key-phrases correspond to respective voice commands.

One or more targeting sensors 220 may be used to generate visual targeting vector data 290 from one or more of a head orientation 287 (also referred to as gaze), an eye orientation 288, and/or a body gesture 289 of a user. A targeting vector may be determined based on targeting vector data 290 as part of the targeting analysis. A gaze vector may be determined from head orientation data captured by one or more gaze tracking sensors of targeting sensors 220. A gaze vector may be defined with respect to an orientation of a head of a user facing toward the user's FOV in multidimensional space (e.g., 2D or 3D space). An eye vector may be determined from eye orientation data captured by one or more eye tracking sensors of targeting sensors 220. An eye vector may be defined with respect to an orientation of an optical axis of an eye of a user in multidimensional space as may be measured by one or more eye tracking sensors of targeting sensors 220. Additional targeting sensors, such as body tracking sensors may be used to generate visual targeting vector data 290, including a pointing vector representing a hand or finger pointing direction of a user, as an example.

Visual targeting vector data 290 may be combined with contextual information from one or more additional sources of data or data streams to form a targeting data stream 291. As an example, a targeting data stream may include an object map 222 or data thereof as a data stream component that indicates a spatial arrangement and/or identity of visual objects targetable by the user within the user's FOV. These visual objects may include physical objects present within the physical environment and/or virtual objects graphically displayed to the user via an HMD device or peripheral display. The arrangement and identity of virtual objects may be known to the computing system implementing processing pipeline 200 as a result of being programmatically defined by one or more executed programs. The arrangement and identity of physical objects may be discovered by optically imaging the physical environment (depth image data and/or two-dimensional image data) and/or by applying object detection/recognition to optical imaging data. Virtual models of the physical environment may aid a computing system in discovering the arrangement and identity of physical objects, and their spatial relationship to virtual objects. As another example, a targeting data stream may include an application state 224 as a data stream component that indicates currently active application programs and/or a current focus application program among the currently active application programs. Additional data stream component may be included in targeting data stream 291 to provide additional context for targeting analysis.

Audio data stream 281 and targeting data stream 291 may form a set of time-variable data streams that are contemporaneous with each other. For example, audio events, such as a spoken utterance or a component of a spoken utterance (e.g., keyword or key-phrase thereof) within an audio data stream may be aligned in time with a targeting event (e.g., a visual targeting vector) within the targeting data stream. Temporal identifiers (e.g., time stamps) may be associated with the audio data stream and/or the targeting data stream to permit their alignment in the time dimension. In at least some examples, two or more temporal identifiers may be associated with a spoken utterance that contains two or more voice commands to enable tracking of different spatial contexts of the targeting data stream within the same spoken utterance. For example, a user may speak the phrase "put this over there" to denote a first point in time when the term "this" was spoken, and a second point in time when the term "there" was spoken. Temporal identifiers may be associated with each of these targeting-specific voice commands within the audio data stream 281 to enable their alignment with contemporaneous targeting data of targeting data stream 291. For each voice command, a temporal identifier may be associated with a predetermined point in time in relation to its spoken utterance portion, which may include a beginning point, an end point, or a predetermined intermediate point along a continuum of the spoken utterance portion of the voice command.

In an example of the reactive targeting analysis technique indicated at 202, the targeting data stream may be stored in a buffer 230 as a buffered targeting data stream. The buffered targeting data stream may have a duration that is defined, at least in part, by a size of buffer 230. For example, buffer 230 may be configured to store five seconds or other suitable duration of a targeting data stream. Buffer 230 may be operated as first-in-first-out storage, and may take the form of a circular buffer in which older data is continuously or periodically overwritten by more recent data. Responsive to identifying a voice command by speech recognition 214, reactive targeting analysis 232 may be performed using buffered targeting data stream 292 or a portion thereof within buffer 230. For example, reactive targeting analysis 232 may receive a temporal identifier 270 corresponding in time to spoken utterance 282 of the voice command, and may identify a visual targeting vector of the user and a visual target of that visual targeting vector within the buffered targeting data stream at a time corresponding to the temporal identifier. The reactive targeting analysis generates a selected visual target 293 for the voice command at the time indicated by the temporal identifier. Reactive targeting analysis 232 and associated processes performed at 202 may be implemented by a reactive targeting analysis module of a computer executed program, as an example. Reactive targeting analysis is described in further detail with reference to method 300 of FIG. 3.

In an example of the proactive targeting analysis technique indicated at 204, proactive targeting analysis 240 may be performed on targeting data stream 291 to generate one or more candidate visual targets 294 that may be stored in a buffer 242 as buffered target data that includes candidate visual targets. Buffer 242 may be operated as first-in-first-out storage, e.g. as a circular buffer in which older data is continuously or periodically overwritten by more recent data. Any suitable quantity of candidate visual targets may be stored in buffer 242, and this quantity may be defined, at least in part, in terms of a predefined duration (e.g., 2-6 seconds) of the targeting data stream. This predetermined duration may be selected or otherwise defined based on latencies associated with the processing of audio data to recognize a voice command. Responsive to identifying a voice command by speech recognition 214, a visual target 295 may be selected from the set of candidate visual targets within buffer 242. Visual target 295 may be selected from the set of candidate visual targets based on a temporal identifier that corresponds in time to the spoken utterance. Accordingly, the proactive targeting analysis 240 is performed prior to detection of the spoken utterance, thereby reducing latency associated with processing targeting data stream 291. Proactive targeting analysis 240 and associated processes performed at 204 may be implemented by a proactive targeting analysis module of a computer executed program, as an example. Proactive targeting analysis is described in further detail with reference to method 300 of FIG. 3.

In an example of the real-time targeting analysis technique indicated at 206, upon identifying presence of a spoken utterance within the audio data stream (as indicated at 284), real-time targeting analysis may be performed at 250 based on the targeting data stream to generate a visual target. Real-time targeting analysis 250 and associated processes performed at 206 may be implemented by a real-time targeting analysis module of a computer executed program, as an example. Real-time targeting analysis is described in further detail with reference to method 400 of FIG. 4.

A visual target identified by any of the above targeting analysis techniques 202, 204, 206, or combinations may be used to identify an associated function 260. For example, a program may include data that defines a mapping between objects that may be visually targeted by a user and their associated functions. Voice command 283 may be directed to function 260 associated with the visual target (e.g., 293, 295, 296) to generate an output 297. Output 297 may take various forms, and may serve as an input to one or more additional functions of a program.

Figure 3:
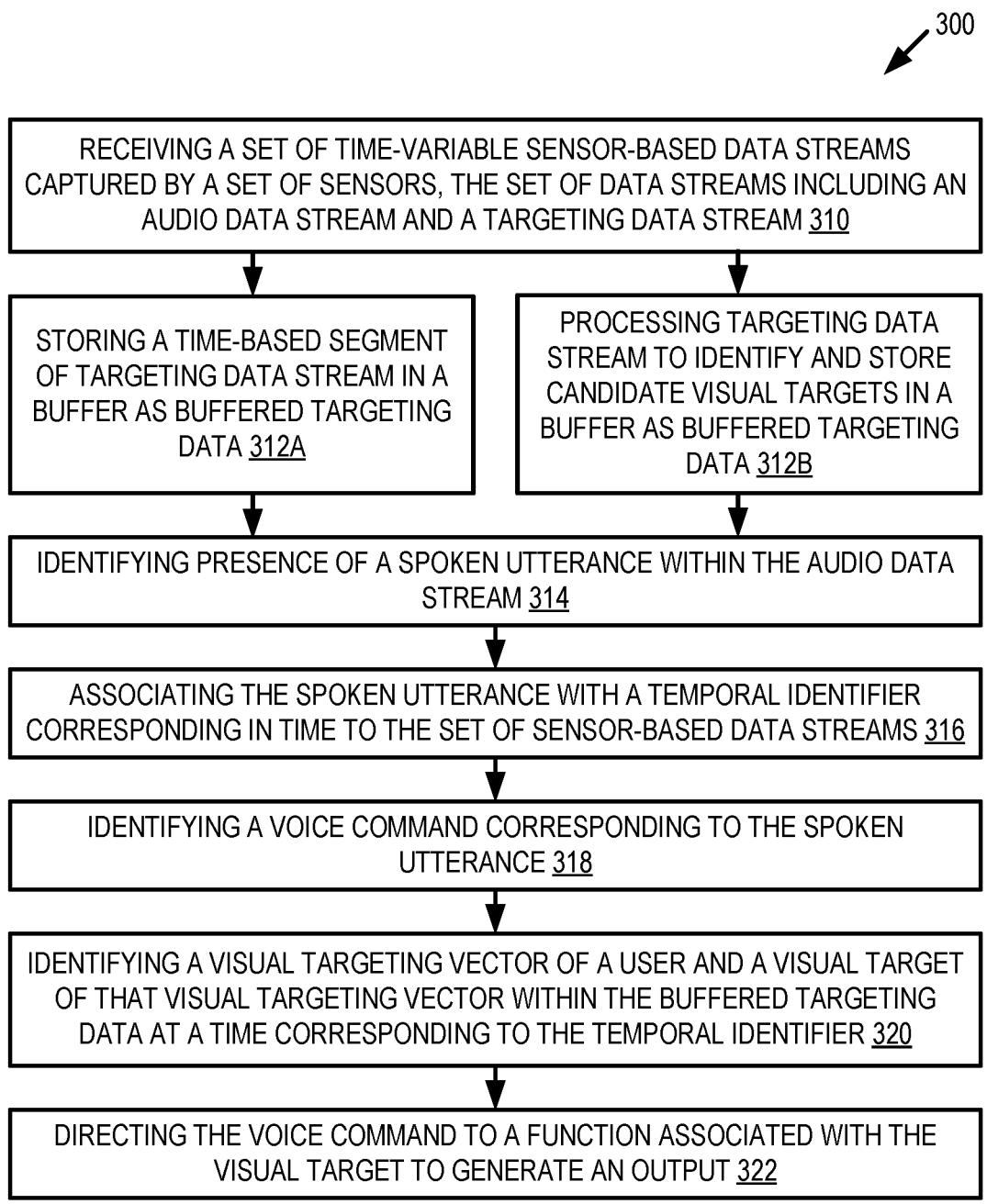
FIG. 3 is a flow diagram depicting an example method performed by a computing system for directing a voice command to a function associated with a visual target using proactive or reactive targeting analysis.

FIG. 3 is a flow diagram depicting an example method 300 performed by a computing system for directing a voice command to a function associated with a visual target. Method 300 describes examples of the proactive targeting analysis and the reactive targeting analysis techniques that store a targeting data stream or processed forms thereof in a buffer as buffered targeting data for use with a subsequently obtained voice command. As previously described with reference to processing pipeline 200 of FIG. 2, proactive targeting analysis may be used to identify and store candidate visual targets as buffered targeting data prior to detecting an utterance and identifying a voice command within an audio data stream. In contrast, reactive targeting analysis may be used to store a time-based segment of a targeting data stream as a buffered targeting data stream that may be used to identify a visual target upon or following identification of a voice command. Each of the above targeting analysis techniques may have respective technical characteristics in terms of (1) the use of computational resources, (2) the use of data storage resources, and (3) the accuracy of the estimate of the visual target by the analysis. Selection of an appropriate targeting analysis technique may be programmatically performed by a computing system, and may depend on features of the computing system that implements the targeting analysis pipeline (e.g., processing and/or storage capability), operating conditions associated with the use-environment, and/or desired performance requirements. In at least some examples, two or more of these targeting analysis techniques may be used interchangeably or may be selectively used based on changes in operating conditions, computing resources, or desired performance. In yet other examples, a single one of these techniques, or two of the three techniques, may be implemented in a system.

At 310, the method includes receiving a set of time-variable sensor-based data streams captured by a set of sensors. The set of data streams include an audio data stream and a targeting data stream. The set of sensors may include one or more audio sensors (e.g., microphones) that capture the audio data stream. Audio sensors may reside on-board a wearable device of a user or may be located within a vicinity of the user, for example.

The targeting data stream may include two or more targeting data stream components of which at least one of the target data stream components is captured by one or more sensors of the set of sensors. Sensors for capturing components of the targeting data stream may include one or more gaze tracking sensors and/or one or more eye tracking sensors integrated with a head-mounted display device, as examples. Gaze tracking sensors include sensors that measure a head orientation of a user, and output that measurement as head orientation data from which a gaze vector based upon the head direction may be determined. Eye tracking sensors include sensors that measure an eye orientation of a user, and output that measurement as eye orientation data from which an eye vector (e.g., optical axis) may be determined. However, other suitable sensors may be used to capture additional or alternative components of the targeting data stream. The targeting data stream may further include object map data that defines a spatial positioning within multidimensional space of one or more visual objects that are targetable by the user. Within the context of virtual objects, the display data representing the one or more visual objects may be output for presentation via a graphical display, enabling a user to visually target the virtual objects. The graphical display may include a near-eye graphical display of a head-mounted display device or a peripheral graphical display, as examples.

At 312A and 312B, FIG. 3 depicts example buffering strategies for buffering different forms of targeting data. Buffered targeting data may include a portion of the targeting data stream or a processed form thereof depending on the targeting analysis technique that is used.

In a first example corresponding to the reactive targeting analysis technique, at 312A, the buffered targeting data includes a time-based segment of the targeting data stream. For example, the time-based segment may include a pre-defined duration (e.g., 2-6 seconds, or other suitable value) preceding a current time or a most recently received portion of the targeting data stream. The buffered targeting data may be associated with one or more temporal identifiers corresponding to a timing of the targeting data stream. The temporal identifiers may take the form of a time stamp, as an example.

In a second example corresponding to the proactive targeting analysis technique, at 312B, the buffered targeting data includes a set of one or more candidate visual targets that are identified and stored by processing the targeting data stream. Within the context of proactive targeting analysis, a visual targeting vector of a user may be identified at 312B based on one or more of a gaze vector defined in relation to a head of a user captured by one or more gaze tracking sensors, an eye vector defined in relation to an eye of the user captured by one or more eye tracking sensors, and/or a pointing vector defined in relation to a body part (e.g., finger, hand, arm, etc.) of the user captured by one or more body tracking sensors at a particular time. A candidate visual target of the visual targeting vector may be identified for the visual targeting vector. The visual target includes a visual object intersected by the visual targeting vector within the FOV at a particular time. The targeting data stream may indicate a position within the FOV of one or more visual objects, enabling a spatial comparison between the position of each visual object and the visual targeting vector at a particular time. The candidate visual targets may be associated with respective temporal identifiers corresponding to a timing of the targeting data stream from which that candidate visual target was identified. The temporal identifiers may take the form of a time stamp, as an example. A plurality of candidate visual targets of the buffered targeting data may include a stream of candidate visual targets ordered according to a relative timing of a targeting data stream segment from which each candidate visual target was identified.

At 314, the method includes identifying presence of a spoken utterance within the audio data stream. In an example, the audio data stream may be provided to a speech detection module which generates an output identifying presence of a spoken utterance. The speech detection module may reside on-board a wearable computing device of a user, at a local client computing system residing in a vicinity of the user, or may be remotely located at a server system that is accessible over a communications network. For example, presence of the spoken utterance may be identified by sending the audio data stream to a remotely located speech detection module over a communications network and receiving an indication of the detected utterance from the speech detection module over the communications network.

At 316, the method includes associating the spoken utterance with a temporal identifier corresponding in time to the set of sensor-based data streams. The temporal identifier may take the form of a time stamp, for example, as previously described with reference to the targeting data stream and buffered targeting data, thereby enabling the spoken utterance to be matched in time to targeting data. The spoken utterance may be associated with the temporal identifier at a predetermined point in time in relation to features of the spoken utterance. As examples, the predetermined point in time may include a beginning point, an end point, or a predetermined intermediate point along a continuum of the spoken utterance. A beginning point and end point of a spoken utterance in relation to other preceding or subsequent spoken utterances may be identified based on a duration of time between an end point of a first spoken utterance and a beginning point of a subsequent, second spoken utterance. Accordingly, the predetermined point in time with which the temporal identifier is associated may be based on a time at which the spoken utterance is determined to have been discontinued.

In examples where a spoken utterance contains multiple voice commands, as may be identified at process 318 discussed in further detail below, the temporal identifier may be associated with a portion of the spoken utterance that corresponds to a particular voice command. For example, the temporal identifier may be associated with the spoken utterance at a predetermined point in time in relation to the voice command, which may include a beginning point, an end point, or a predetermined intermediate point along a continuum of the spoken utterance portion that corresponds to the voice command. This process may be performed for each voice command contained within the spoken utterance so that each portion of the spoken utterance is associated with a respective temporal identifier.

At 318, the method includes identifying one or more voice commands corresponding to the spoken utterance. In an example, voice commands may be identified by a speech recognition module based on a segment of an audio data stream containing the spoken utterance. The speech recognition module may reside on-board a wearable computing device of a user, at a local client computing system residing in a vicinity of the user, or may be remotely located at a server system that is accessible over a communications network. For example, a voice command may be identified by sending the spoken utterance to a remotely located speech recognition module over a communications network and receiving the voice command (or an indication thereof) from the speech recognition module over the communications network.

In an example in which a subsequent spoken utterance is identified within the audio data stream within a predetermined time proximity following the discontinuation of the spoken utterance, the voice command identified at 318 may be updated to correspond to a combination of both the spoken utterance and the subsequent spoken utterance. For example, a voice command "volume up" may be formed from an initial spoken utterance "volume" and a subsequent spoken utterance "up" that are separated in time from each other. On the other hand, a subsequent voice command corresponding to a subsequent spoken utterance may be identified as beginning at a point in time that is outside a predetermined time proximity following the discontinuation of an earlier spoken utterance. For example, two voice commands "forward" and "back" may be identified within an audio data stream that contains "forward back" having sufficient delay between the spoken utterance "forward" and the subsequent spoken utterance "back". The amount of delay may be selected to accommodate the natural cadence of human speech.

At 320, the method includes identifying a visual target of a visual targeting vector within the buffered targeting data at a time corresponding to the temporal identifier associated with the spoken utterance for which the voice command was identified. Within the context of the proactive targeting analysis in which the buffered targeting data includes a set of one or more candidate visual targets, the temporal identifier associated with the spoken utterance may be used to select a candidate visual target from among the set of candidate visual targets of the buffered targeting data that corresponds in time to the temporal identifier.

Within the context of reactive targeting analysis in which the buffered targeting data includes a time-based segment of the targeting data stream, a visual targeting vector of a user may be identified at 320 based on one or more of a gaze vector defined in relation to a head of a user captured by one or more gaze tracking sensors, an eye vector defined in relation to an eye of the user captured by one or more eye tracking sensors, and/or a pointing vector defined in relation to a body part (e.g., finger, hand, arm, etc.) of the user captured by one or more body tracking sensors at a time corresponding to the temporal identifier. A visual target of the visual targeting vector may be likewise identified at the time corresponding to the temporal identifier. The visual target includes a visual object intersected by the visual targeting vector within the FOV at the time corresponding to the temporal identifier. As previously described, the targeting data stream may indicate a spatial positioning of one or more visual objects, enabling a spatial comparison between the position of each visual object and the visual targeting vector at a particular time.

At 322, the method includes directing the voice command to a function associated with the visual target to generate an output. Each function may be configured to receive a set of one or more voice commands and generate a respective output for each voice command of the set. As an example, a volume control function associated with a visual object that serves as a volume control selector may be configured to receive a first voice command corresponding to "volume up" to generate an output that increases volume, a second voice command corresponding to "volume down" to generate an output that decreases volume, and a third voice command corresponding to "mute" to generate an output that mutes volume of an audio/video player application. It will be understood that any suitable function supporting any suitable quantity of voice commands may be associated with an object that may be visually targeted by a user.

Figure 4:
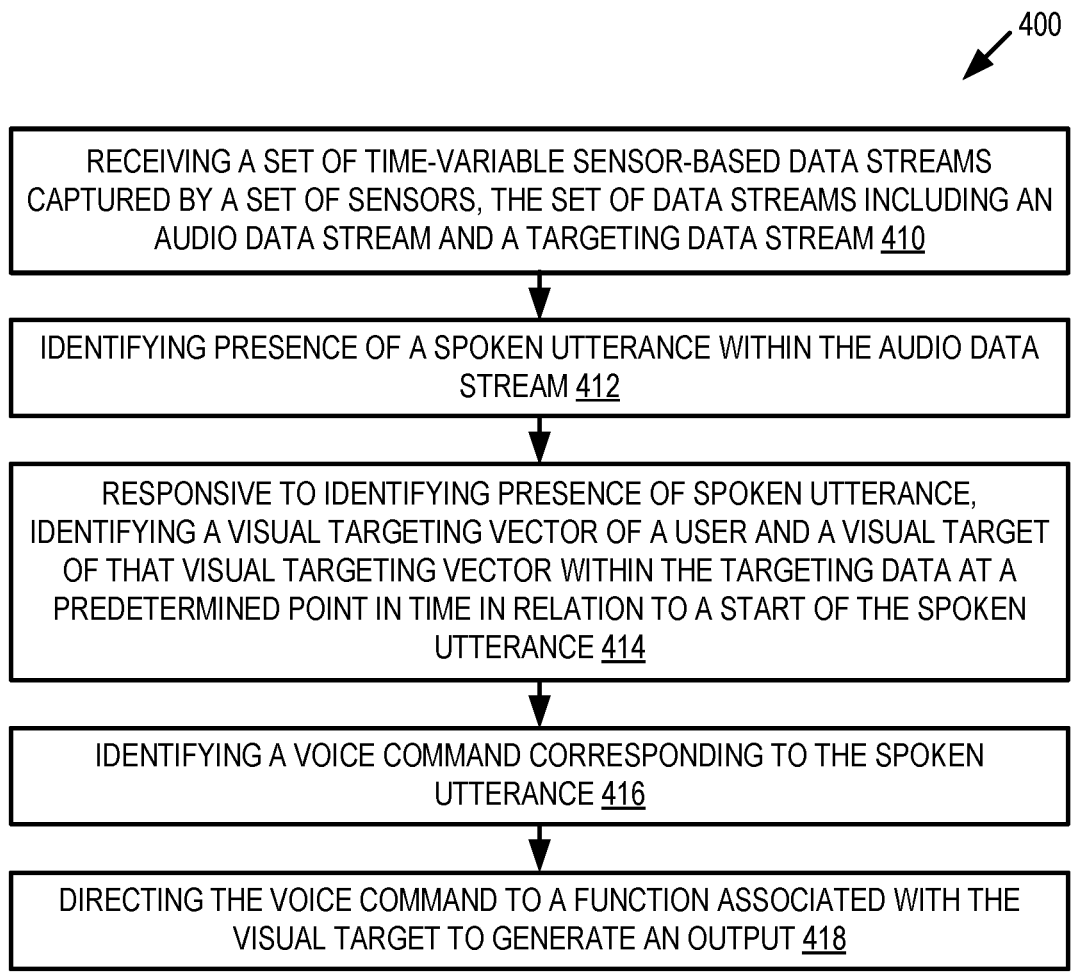
FIG. 4 is a flow diagram depicting an example method performed by a computing system for directing a voice command to a function associated with a visual target using real-time targeting analysis.

FIG. 4 is a flow diagram depicting an example method 400 performed by a computing system for directing a voice command to a function associated with a visual target. Method 400 describes an example of the real-time targeting analysis technique that does not necessarily rely on buffered targeting data to identify a visual target. Rather, analysis of the targeting data stream may be initiated responsive to onset of a spoken utterance or some other point in time along a continuum of the spoken utterance to identify a visual target that is contemporaneous with at least a portion of the spoken utterance.

At 410, the method includes receiving a set of time-variable sensor-based data streams captured by a set of sensors. As previously described with reference to process 310 of method 300, the set of data streams include an audio data stream and a targeting data stream.

At 412, the method includes identifying presence of a spoken utterance within the audio data stream. In at least some examples, process 416 may be performed similarly to process 314 with respect to proactive and reactive targeting analyses. For example, the audio data stream may be provided to a speech detection module which generates an output identifying presence of a spoken utterance. The speech detection module may reside on-board a wearable computing device of a user, at a local client computing system residing in a vicinity of the user, or may be remotely located at a server system that is accessible over a communications network. For example, presence of the spoken utterance may be identified by sending the audio data stream to a remotely located speech detection module over a communications network and receiving an indication of the detected utterance from the speech detection module over the communications network.

At 414, responsive to identifying the presence of the spoken utterance, the method includes identifying a visual targeting vector of a user and a visual target of that visual targeting vector at a predetermined point in time in relation to a start of the spoken utterance. The predetermined point in time may include a beginning point, an end point, or a predetermined intermediate point along a continuum of the spoken utterance, depending on implementation. In examples where a spoken utterance contains multiple voice commands, as may be identified at process 416 discussed in further detail below, the predetermined point in time for which the visual targeting vector and the visual target are identified may correspond to a particular voice command. For example, the predetermined point in time may be defined in relation to a portion of the spoken utterance corresponding to the voice command, which may include a beginning point, an end point, or a predetermined intermediate point along a continuum of the spoken utterance portion that corresponds to the voice command. This process may be performed for each voice command contained within the spoken utterance.

In at least some examples, process 414 may be performed similarly to processes 312B with respect proactive targeting analysis and/or 320 with respect to reactive targeting analysis. For example, a visual targeting vector of a user may be identified at 414 based on one or more of a gaze vector defined in relation to a head of a user captured by one or more gaze tracking sensors, an eye vector defined in relation to an eye of the user captured by one or more eye tracking sensors, and/or a pointing vector defined in relation to a body part (e.g., finger, hand, arm, etc.) of the user captured by one or more body tracking sensors at a time of the spoken utterance. A visual target of the visual targeting vector may be likewise identified at the time of the spoken utterance. As previously described, the visual target includes a visual object intersected by the visual targeting vector within the FOV of the user at the time corresponding to the temporal identifier, and the targeting data stream may indicate a spatial positioning of one or more visual objects, enabling a spatial comparison between the position of each visual object and the visual targeting vector at a particular time.

At 416, the method includes identifying a voice command corresponding to the spoken utterance. In at least some examples, process 416 may be performed similarly to process 318 with respect proactive and reactive targeting analyses. For example, the voice command may be identified by a speech recognition module based on a segment of an audio data stream containing the spoken utterance. The speech recognition module may reside on-board a wearable computing device of a user, at a local client computing system residing in a vicinity of the user, or may be remotely located at a server system that is accessible over a communications network. For example, the voice command may be identified by sending the spoken utterance to a remotely located speech recognition module over a communications network and receiving the voice command from the speech recognition module over the communications network.

At 418, the method includes directing the voice command to a function associated with the visual target to generate an output. In at least some examples, process 418 may be performed similarly to process 322 with respect proactive and reactive targeting analyses. For example, each function may be configured to receive a set of one or more voice commands and generate a respective output for each voice command of the set.

The above example targeting analysis techniques may be used to address the issue of delay associated with identification of voice commands, thereby helping to avoid targeting errors that could result from a user changing head or eye orientation.

In at least some examples, the methods and processes described herein may be tied to a computing system of one or more computing devices. In particular, such methods and processes may be implemented as a computer-application program or service, an application-programming interface (API), a library, and/or other computer-program product.

Figure 5:
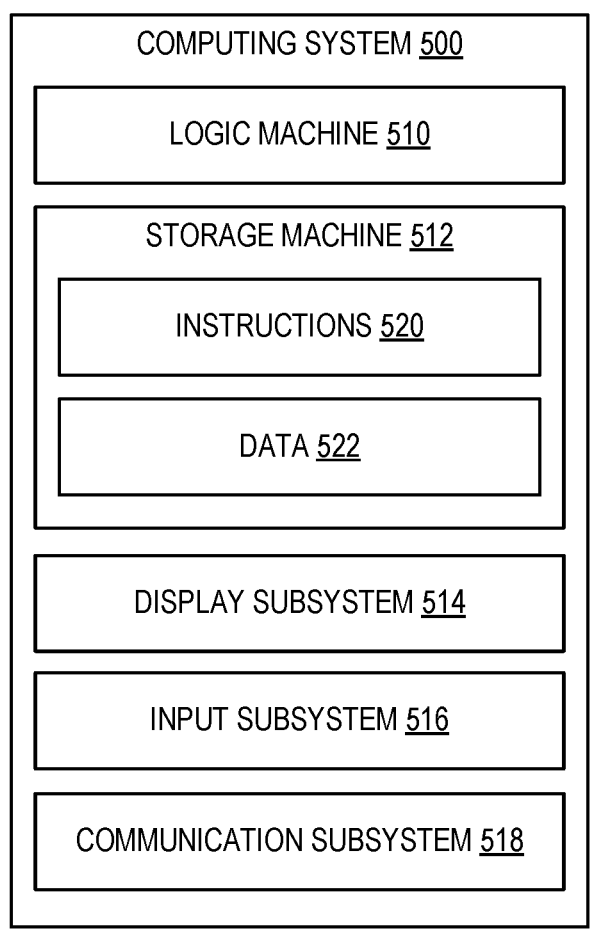
FIG. 5 is a schematic diagram depicting an example computing system.

FIG. 5 schematically shows an example of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), wearable devices (e.g., HMD device) and/or other computing devices.

Computing system 500 includes a logic machine 510 and a storage machine 512. Computing system 500 may optionally include a display subsystem 514, input subsystem 516, communication subsystem 518, and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 512 includes one or more physical devices configured to hold instructions 520 executable by the logic machine and/or other forms of data 522 to implement the methods and processes described herein. When such methods and processes are implemented, the state of storage machine 512 may be transformed—e.g., to hold different data. The buffers described herein may be included or defined within storage machine 512.

Storage machine 512 may include removable and/or built-in devices. Storage machine 512 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 512 may include volatile, nonvolatile, dynamic, static, read/write, read-only, random-access, sequential-access, location-addressable, file-addressable, and/or content-addressable devices.

It will be appreciated that storage machine 512 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 514 may be used to present a visual representation of data held by storage machine 512. This visual representation may take the form of a graphical user interface (GUI). As the herein described methods and processes change the data held by the storage machine, and thus transform the state of the storage machine, the state of display subsystem 514 may likewise be transformed to visually represent changes in the underlying data. Display subsystem 514 may include one or more display devices utilizing virtually any type of technology. Such display devices may be combined with logic machine 510 and/or storage machine 512 in a shared enclosure (e.g., an HMD device, mobile device, tablet computer, etc.), or such display devices may be peripheral display devices.

When included, input subsystem 516 may comprise or interface with one or more input devices such as a sensor or a user input device (e.g., a keyboard, mouse, touch screen, or game controller). In at least some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech detection, and speech and/or voice recognition; an infrared, color, stereoscopic, and/or depth camera for machine vision and/or gesture recognition; a head tracker, eye tracker, body tracker, inertial sensor, accelerometer, gyroscope, and/or magnetometer/compass for motion detection and/or intent recognition; as well as electric-field sensing componentry for assessing brain activity.

When included, communication subsystem 518 may be configured to communicatively couple computing system 500 with one or more other computing devices. Communication subsystem 518 may include wired and/or wireless communication devices compatible with one or more different communication protocols. As examples, the communication subsystem may be configured for communication via a wireless telephone network, or a wired or wireless local- or wide-area network. In at least some examples, the communication subsystem may allow computing system 500 to send and/or receive messages to and/or from other devices via a network such as the Internet.

In another example, a method performed by a computing system for directing a voice command to a function associated with a visual target comprises: receiving a set of time-variable sensor-based data streams captured by a set of sensors, the set of data streams including an audio data stream and a targeting data stream; storing the targeting data stream in a buffer as buffered targeting data; identifying presence of a spoken utterance within the audio data stream; associating the spoken utterance with a temporal identifier corresponding in time to the set of sensor-based data streams; identifying a voice command corresponding to the spoken utterance; identifying a visual targeting vector within the buffered targeting data at a time corresponding to the temporal identifier; identifying a visual target of the visual targeting vector at the time corresponding to the temporal identifier; and directing the voice command to a function associated with the visual target to generate an output. In this example or any other example disclosed herein, the visual targeting vector is identified based on one or more of: a gaze vector defined in relation to a head of a user captured by one or more gaze tracking sensors of the set of sensors, and/or an eye vector defined in relation to an eye of the user captured by one or more eye tracking sensors of the set of sensors. In this example or any other example disclosed herein, identifying the voice command includes sending the spoken utterance to a remotely located speech recognition module over a communications network and receiving the voice command from the speech recognition module over the communications network. In this example or any other example disclosed herein, the targeting data stream further indicates a spatial positioning of one or more visual objects; and the visual target includes a visual object of the one or more visual objects intersected by the visual targeting vector within a field of view of a user at the time corresponding to the temporal identifier. In this example or any other example disclosed herein, the method further comprises outputting display data representing the one or more visual objects for presentation via a graphical display. In this example or any other example disclosed herein, the graphical display is a near-eye graphical display of a head-mounted display device; and the one or more gaze tracking sensors and/or the one or more eye tracking sensors are integrated with the head-mounted display device. In this example or any other example disclosed herein, the graphical display is a peripheral graphical display. In this example or any other example disclosed herein, associating the spoken utterance with the temporal identifier in relation to the set of sensor-based data streams includes associating a predetermined point in time of the spoken utterance with the temporal identifier, in which the predetermined point in time includes a beginning point, an end point, or a predetermined intermediate point along a continuum of the spoken utterance. In this example or any other example disclosed herein, the predetermined point in time is identified based, at least in part, on a discontinuation of the spoken utterance for at least a predetermined duration of time. In this example or any other example disclosed herein, upon a subsequent spoken utterance being identified within the audio data stream within a predetermined time proximity following the discontinuation of the spoken utterance, the method comprises updating the voice command to correspond to a combination of both the spoken utterance and the subsequent spoken utterance. In this example or any other example disclosed herein, upon a subsequent spoken utterance being identified within the audio data stream outside a predetermined time proximity following the discontinuation of the spoken utterance, the method comprises identifying a subsequent voice command corresponding to the subsequent spoken utterance. In this example or any other example disclosed herein, the buffered targeting data includes a set of one or more candidate visual targets associated with respective temporal identifiers identified within the targeting data stream prior to identifying presence of the spoken utterance.

In another example, a computing system comprises: a logic machine; and a data storage machine having instructions stored thereon executable by the logic machine to: receive a set of time-variable sensor-based data streams captured by a set of sensors, the set of data streams including an audio data stream and a targeting data stream; store the targeting data stream in a buffer as buffered targeting data; identify presence of a spoken utterance within the audio data stream; associate the spoken utterance with a temporal identifier corresponding in time to the set of sensor-based data streams; identify a voice command corresponding to the spoken utterance; identify a visual targeting vector within the buffered targeting data at a time corresponding to the temporal identifier; identify a visual target of the visual targeting vector at the time corresponding to the temporal identifier; and direct the voice command to a function associated with the visual target to generate an output. In this example or any other example disclosed herein, the instructions are further executable by the logic machine to identify the voice command by sending the spoken utterance to a remotely located speech recognition module over a communications network and receiving the voice command from the speech recognition module over the communications network. In this example or any other example disclosed herein, the instructions are further executable by the logic machine to identify the visual targeting vector based on one or more of: a gaze vector defined in relation to a head of a user captured by one or more gaze tracking sensors of the set of sensors, and/or an eye vector defined in relation to an eye of the user captured by one or more eye tracking sensors of the set of sensors. In this example or any other example disclosed herein, the targeting data stream further indicates a spatial positioning of one or more visual objects; and the visual target includes a visual object of the one or more visual objects intersected by the visual targeting vector within a field of view of a user at the time corresponding to the temporal identifier.

In another example, a method performed by a computing system for directing a voice command to a function associated with a visual target comprises: receiving a set of time-variable sensor-based data streams captured by a set of sensors, the set of data streams including an audio data stream and a targeting data stream; identifying presence of a spoken utterance within the audio data stream; responsive to identifying presence of the spoken utterance, identifying a visual target of a visual targeting vector of a user and a visual target of that visual targeting vector at a predetermined point in time in relation to a start of the spoken utterance; identifying a voice command corresponding to the spoken utterance; and directing the voice command to a function associated with the visual target to generate an output. In this example or any other example disclosed herein, the predetermined point time includes a beginning point, an end point, or a predetermined intermediate point along a continuum of the spoken utterance. In this example or any other example disclosed herein, the method comprises identifying the voice command includes sending the spoken utterance to a remotely located speech recognition module over a communications network and receiving the voice command from the speech recognition module over the communications network. In this example or any other example disclosed herein, the visual targeting vector is identified based on one or more of: a gaze vector defined in relation to a head of a user captured by one or more gaze tracking sensors of the set of sensors, and/or an eye vector defined in relation to an eye of the user captured by one or more eye tracking sensors of the set of sensors.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system for directing a voice command to a function associated with a visual target, the method comprising:
   receiving a set of time-variable sensor-based data streams captured by a set of sensors, the set of data streams including an audio data stream and a targeting data stream;
   identifying, within the targeting data stream, one or more candidate visual targets, each candidate visual target identified at least in part by a respective visual targeting vector and a respective temporal identifier that identifies a time within the targeting data stream;

storing the one or more candidate visual targets and respective temporal identifiers in a buffer as buffered targeting data, the buffer defining a duration of a time-based segment of the targeting data stream for which the one or more candidate visual targets are retained as the buffered targeting data;

identifying presence of a spoken utterance within the audio data stream after identifying the one or more candidate visual targets;

identifying a voice command from the spoken utterance;

associating the voice command corresponding to the spoken utterance with a temporal identifier for the voice command;

responsive to identifying the voice command from the spoken utterance, selecting a visual target from among the one or more candidate visual targets based on the temporal identifier for the voice command and the respective temporal identifiers associated with the one or more candidate visual targets;

directing the voice command to a function associated with the visual target; and generating an output in response to directing the voice command to the function associated with the visual target.

2. The method of claim 1, wherein each respective visual targeting vector is identified based on one or more of:

a gaze vector defined in relation to a head of a user captured by one or more gaze tracking sensors of the set of sensors, and/or an eye vector defined in relation to an eye of the user captured by one or more eye tracking sensors of the set of sensors.

3. The method of claim 1, wherein identifying the voice command includes sending the spoken utterance to a remotely located speech recognition module over a communications network and receiving the voice command from the speech recognition module over the communications network.

4. The method of claim 3, wherein the targeting data stream further indicates a spatial positioning of one or more visual objects; and wherein the visual target includes a visual object of the one or more visual objects intersected by the respective visual targeting vector within a field of view of a user at a time corresponding to the temporal identifier.

5. The method of claim 4, further comprising outputting display data representing the one or more visual objects for presentation via a graphical display.

6. The method of claim 5, wherein the graphical display is a near-eye graphical display of a head-mounted display device; and wherein the one or more gaze tracking sensors and/or the one or more eye tracking sensors are integrated with the head-mounted display device.

7. The method of claim 5, wherein the graphical display is a peripheral graphical display.

8. The method of claim 1, wherein associating the spoken utterance with the temporal identifier in relation to the set of sensor-based data streams includes associating a predetermined point in time of the spoken utterance with the temporal identifier; and wherein the predetermined point in time includes a beginning point, an end point, or a predetermined intermediate point along a continuum of the spoken utterance.

9. The method of claim 8, wherein the predetermined point in time is identified based, at least in part, on a discontinuation of the spoken utterance for at least a predetermined duration of time.

10. The method of claim 9, wherein upon a subsequent spoken utterance being identified within the audio data stream within a predetermined time proximity following the discontinuation of the spoken utterance, updating the voice command to correspond to a combination of both the spoken utterance and the subsequent spoken utterance.

11. The method of claim 9, wherein upon a subsequent spoken utterance being identified within the audio data stream outside a predetermined time proximity following the discontinuation of the spoken utterance, identifying a subsequent voice command corresponding to the subsequent spoken utterance.

12. A computing system, comprising:

a logic machine; and a data storage machine having instructions stored thereon executable by the logic machine to:

receive a set of time-variable sensor-based data streams captured by a set of sensors, the set of data streams including an audio data stream and a targeting data stream;

identify, within the targeting data stream, one or more candidate visual targets, each candidate visual target identified at least in part by a respective visual targeting vector and a respective temporal identifier that identifies a time within the targeting data stream;

store the one or more candidate visual targets and respective temporal identifiers in a buffer as buffered targeting data, the buffer defining a duration of a time-based segment of the targeting data stream for which the one or more candidate visual targets are retained as the buffered targeting data;

identify presence of a spoken utterance within the audio data stream after identifying the one or more candidate visual targets;

identify a voice command corresponding to the spoken utterance;

associate the voice command corresponding with the spoken utterance with a temporal identifier for the voice command;

responsive to identifying the voice command corresponding to the spoken utterance, selecting a visual target from among the one or more candidate visual targets based on the temporal identifier for the voice command and the respective temporal identifiers associated with the one or more candidate visual targets;

direct the voice command to a function associated with the visual target; and generate an output in response to directing the voice command to the function associated with the visual target.

13. The computing system of claim 12, wherein the instructions are further executable by the logic machine to identify the voice command by sending the spoken utterance to a remotely located speech recognition module over a communications network and receiving the voice command from the speech recognition module over the communications network.

14. The computing system of claim 12, wherein the instructions are further executable by the logic machine to identify each respective visual targeting vector based on one or more of:

a gaze vector defined in relation to a head of a user captured by one or more gaze tracking sensors of the set of sensors, and/or an eye vector defined in relation to an eye of the user captured by one or more eye tracking sensors of the set of sensors.

15. The computing system of claim 14, wherein the targeting data stream further indicates a spatial positioning of one or more visual objects; and wherein the visual target includes a visual object of the one or more visual objects intersected by the respective visual targeting vector within a field of view of a user at a time corresponding to the temporal identifier.

16. The method of claim 1, wherein the buffer comprises a circular buffer in which older buffered targeting data is continuously or periodically overwritten by more recent data of the targeting data stream.

17. The computing system of claim 12, wherein the buffer comprises a circular buffer in which older buffered targeting data is continuously or periodically overwritten by more recent data of the targeting data stream.

\* \* \* \* \*